United States Patent [19]

Kagaya

[11] Patent Number: 5,220,635
[45] Date of Patent: Jun. 15, 1993

[54] DATA SINK HAVING HIGH EFFICIENCY IN RECEIVED DATA PROCESSING

[75] Inventor: Yoshihisa Kagaya, Tokyo, Japan

[73] Assignee: Oki Electric Industry Co., Ltd., Tokyo, Japan

[21] Appl. No.: 768,338

[22] Filed: Sep. 30, 1991

Related U.S. Application Data

[63] Continuation of Ser. No. 556,485, Jul. 24, 1990.

[30] Foreign Application Priority Data

Jul. 24, 1989 [JP] Japan ................................. 1-188746

[51] Int. Cl.⁵ ............................................. G06F 13/00
[52] U.S. Cl. ................................... 395/275; 395/250; 395/550; 364/239; 364/270.6
[58] Field of Search ... 364/200 MS File, 900 MS File; 395/250, 275, 550

[56] References Cited

U.S. PATENT DOCUMENTS

| | | | |
|---|---|---|---|
| 3,953,835 | 4/1976 | Cuccio et al. | 364/200 |
| 4,603,382 | 7/1986 | Cole et al. | 364/200 |
| 5,027,348 | 6/1991 | Curry, Jr. | 370/85.1 |

Primary Examiner—Dale M. Shaw
Assistant Examiner—Diane E. Smith
Attorney, Agent, or Firm—Spencer, Frank & Schneider

[57] ABSTRACT

A data sink periodically monitors for the arrival of data coming from a data source in a time interval and starts a data receiving procedure when data have arrived. The data sink includes a data processor for processing the received data, a first counter for counting the number of the received data, a second counter for measuring the period in which the data are received, and a data receiving circuit for receiving the data from the data source. The data receiving circuit periodically monitors for the arrival of data in the time interval and, when data have been received, transfers the received data to the processor. In an initial operating mode the receiving circuit calculates, based on the counted number of received data and the measured period, a predicted value defining the time interval for the data receiving circuit to periodically monitor for the arrival of data. Consequently, in spite of using the received-data monitoring method for inputting data, the data sink can provide throughput substantially as high as that of the interrupt method to improve processing efficiency.

10 Claims, 4 Drawing Sheets

DATA SINK HAVING HIGH EFFICIENCY IN RECEIVED DATA PROCESSING

This application is a continuation, division, of application Ser. No. 07/556,485, filed Jul. 24, 1990.

BACKGROUND OF THE INVENTION

1. Field of the Invention

The present invention relates to a data sink for receiving data coming from the outside thereof through an interface.

2. Description of the Prior Art

Conventional systems for receiving data from a host computer through an interface include the interruption method and the received data monitoring method.

In the interruption method, specific hardware for generating interruptions is used when the data sink receives data. During an interruption the data sink executes a data receiving procedure.

On the other hand, in the received data monitoring method, a data receiving processor itself periodically monitors to determine whether or not received data have arrived therein, and starts data receiving processing if data have arrived at the time of monitoring.

In an application of the interruption method, a receiving controller which works as an interface generates an interruption using specific hardware to enable the receiving controller to start data receiving processing. Consequently, in the processing by the receiving controller, waste of time can be minimized, resulting in improved processing efficiency. However, since specific hardware for generating interruptions is required, circuit construction is complicated, resulting in a cost increase. For those reasons, the specific hardware has been included in comparatively high-grade equipment.

On the contrary, in comparatively low-grade equipment the above-mentioned received data monitoring method of monitoring the arrival of data received in a predetermined period is employed. There is no problem if a period used for monitoring happens to accord with a period in which data is transmitted from a host computer, but if the two periods are different from each other defects arise, such as lowering of processing efficiency in the receiving controller which lowers the throughput in receiving data.

SUMMARY OF THE INVENTION

It is therefore an object of the present invention to provide a data sink which basically starts data receiving processing in the received data monitoring method and is which, by probabilistically predicting within the data sink a period in which data is transmitted coming from the outside of the data sink, is capable of removing defects in the afore-mentioned interruption method and ones in the afore-mentioned received data monitoring method to improve efficiency in data receiving processing.

In accordance with the present invention, the data sink for receiving data from a data source includes data processing means for carrying out data processing on data transmitted from the data source, data receiving means connected to the data processing means and the data source for receiving data from the data source and periodically monitoring the arrival of the data from the data source in a time interval in order to transfer, when data have been received, the received data to the data processing means, first counting means connected to the data receiving means for counting the number of received data to produce a first count representative of the number, second counting means connected to the data receiving means for measuring a period of time during which the data receiving means receives the data to produce a second count representative of the measured period of time, and timing means connected to the data receiving means for generating a timing signal defining the time interval in order to provide the data receiving means with the timing signal. The data receiving means includes arithmetic means for calculating a predicted value for the period of the received data on the basis of the first and second counts. The timing means is operative in response to the predicted value to generate the timing signal. The data receiving means is responsive to the timing signal to periodically monitor the arrival of the data.

Further, in accordance with the present invention, when executing data receiving processing, the data sink probabilistically calculates the arrival period of received data to establish a monitoring interval for receiving data. Therefore, even when the received data monitoring method is employed, it is possible to obtain throughput substantially as high as that obtained at the time of receiving data by the interruption method.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
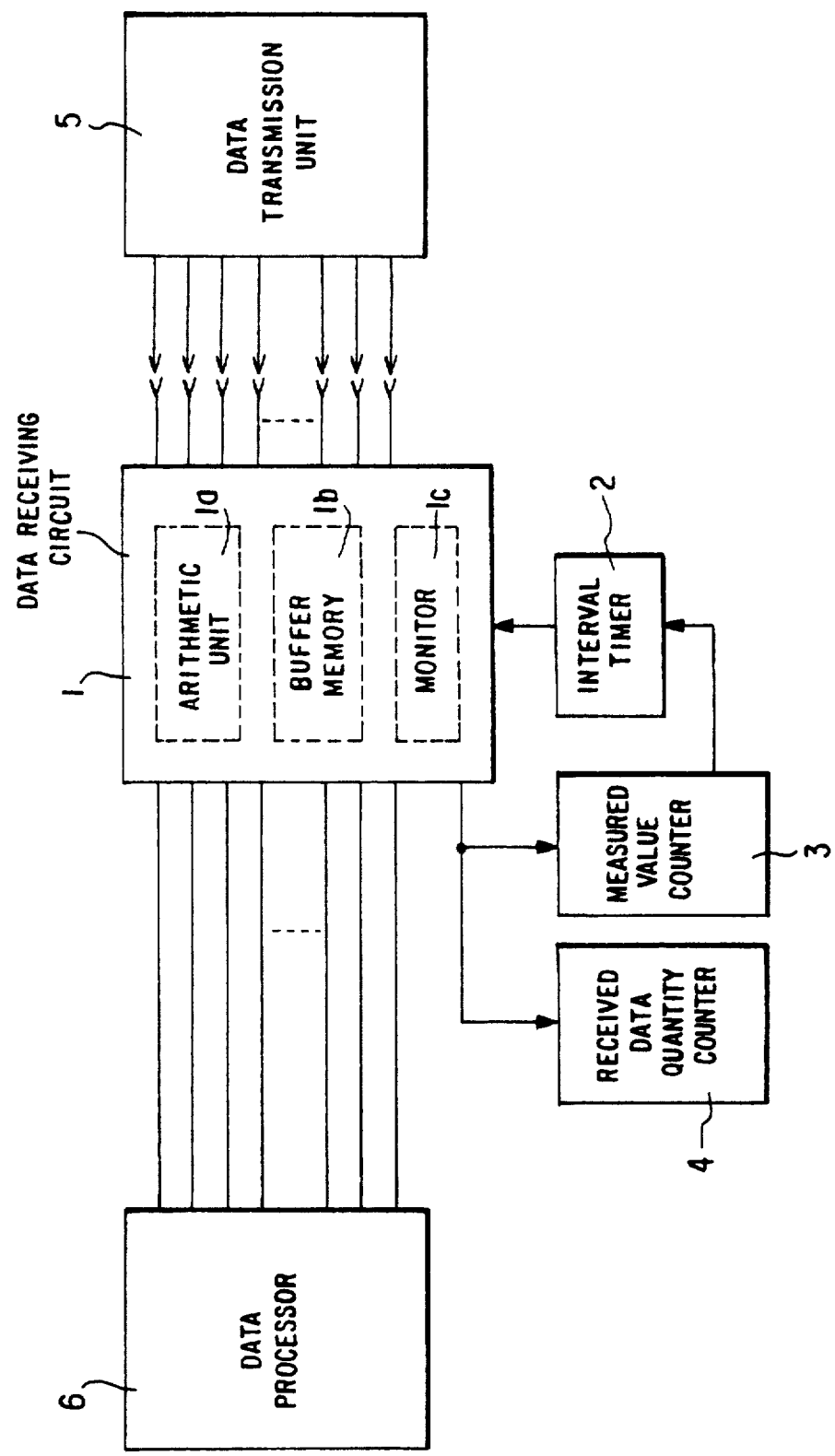
FIG. 1 is a schematic block diagram showing the construction of an embodiment of the data sink of the present invention.

FIG. 1 exemplifies an embodiment of the data sink of the present invention. Reference numeral 1 indicates a data receiving circuit (a receiving controller) which works as an interface and incorporates an arithmetic unit 1a therein. The data receiving circuit 1 receives data coming from an external data transmission unit 5 (for example, a host computer) outside the data sink. Data receiving circuit 1 temporarily stores the data in a buffer memory 1b incorporated in data receiving circuit 1. In response to a timing signal periodically transmitted from an interval timer 2, the data receiving circuit 1 checks the content of the buffer memory 1b to monitor the arrival of received data. data (as is illustrated schematically by monitor 1c). If the data receiving circuit finds, in the checking of the buffer memory 1b at the time of monitoring, that received data have arrived therein, it sends the data to a data processor 6 and causes the data processor 6 to start processing of the data. In order to remove inconsistency between the monitoring period of the interval timer 2 and the period in which data is transferred from the outside of the data sink. The data receiving circuit 1 is adapted to calculate the mean value for the period of the received data in a method described hereafter.

The interval timer 2, while the data receiving circuit 1 is measuring the period of the received data (in the processing steps 201-210 shown in FIG. 2 and described hereafter), generates timing signals necessary for measuring intervals at which data is received. Further, after the completion of measuring these intervals, the mean value of the periods thus measured is set as an interval time for the interval timer 2. Whenever the interval timer 2 has timed an interval corresponding to the mean value, it generates an interrupt request which causes to the data receiving circuit 1 to monitor the arrival of data.

A measured value counter 3 is incremented every time an interruption is caused by the interval timer 2, to obtain the number of the interruptions while the data receiving circuit 1 is in the mode of measuring the period of the received data. Specifically, the measured value counter 3 holds a count which represents the number of timing signals generated by the interval timer 2. Further, the measured value counter 3, after the completion of measuring the received data periods, stores the mean value of the measured periods calculated by the data receiving circuit 1 and sets the mean value as a time interval for the interval timer 2 to establish a period in which data receiving circuit 1 monitors its buffer memory as to whether or not it has received new data.

A received data quantity counter 4 counts the number of received data coming from the data transmission unit 5. Interval timer 2, measured value counter 3, and received data quantity counter 4 are kept under the control of the data receiving circuit 1.

Further, to obtain necessary information from data transferred through the data receiving circuit 1, a data processor 6 is provided to execute data processing, such as decoding of received data.

The illustrative embodiment of the data sink includes, as described above, the data receiving circuit 1, the interval timer 2, the measured value counter 3, the received data quantity counter 4, and the data processor 6.

Figure 2A:
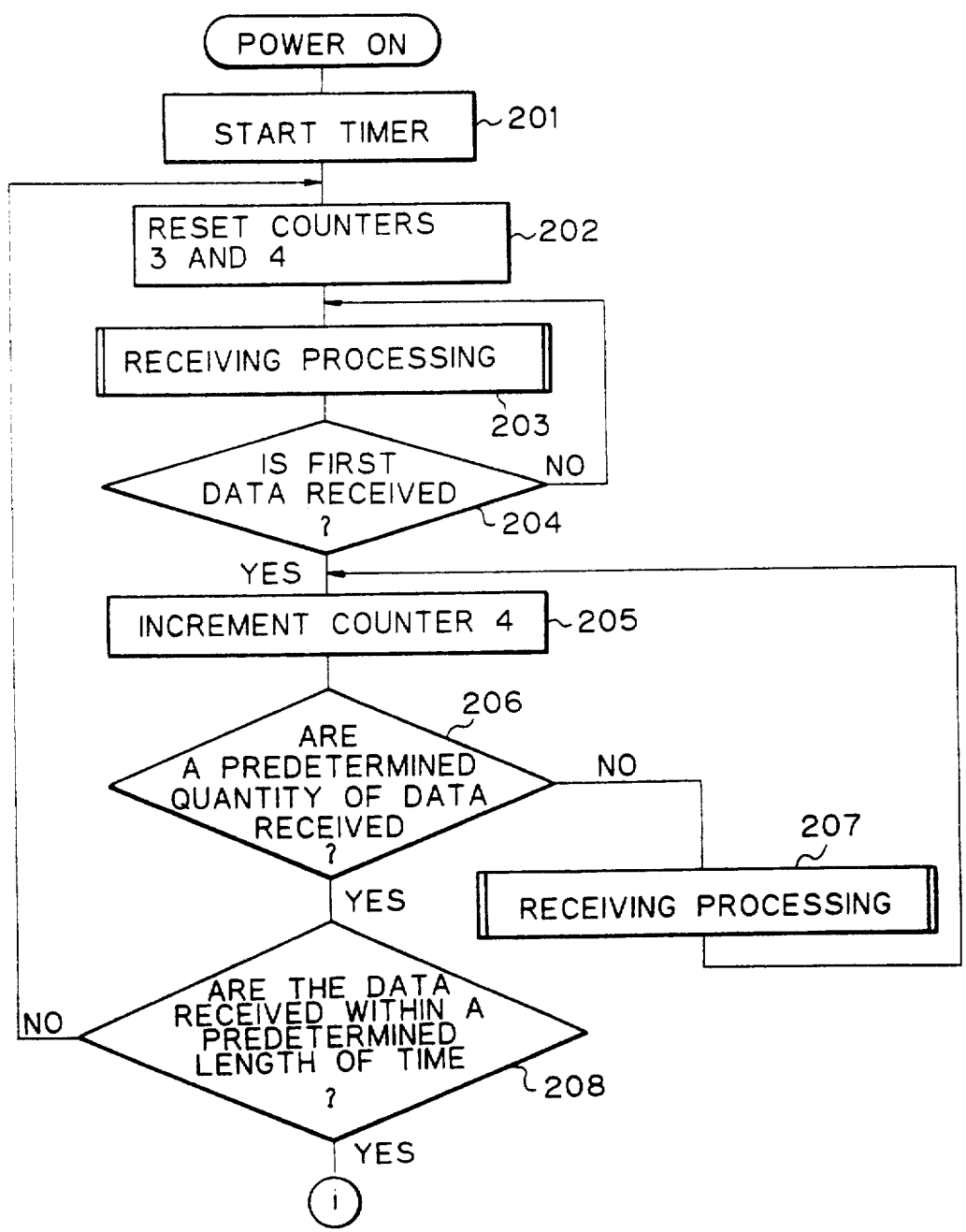
FIGS. 2A and 2B are operational flowcharts showing a detailed operational procedure of the data sink shown in FIG. 1.
Figure 2B:
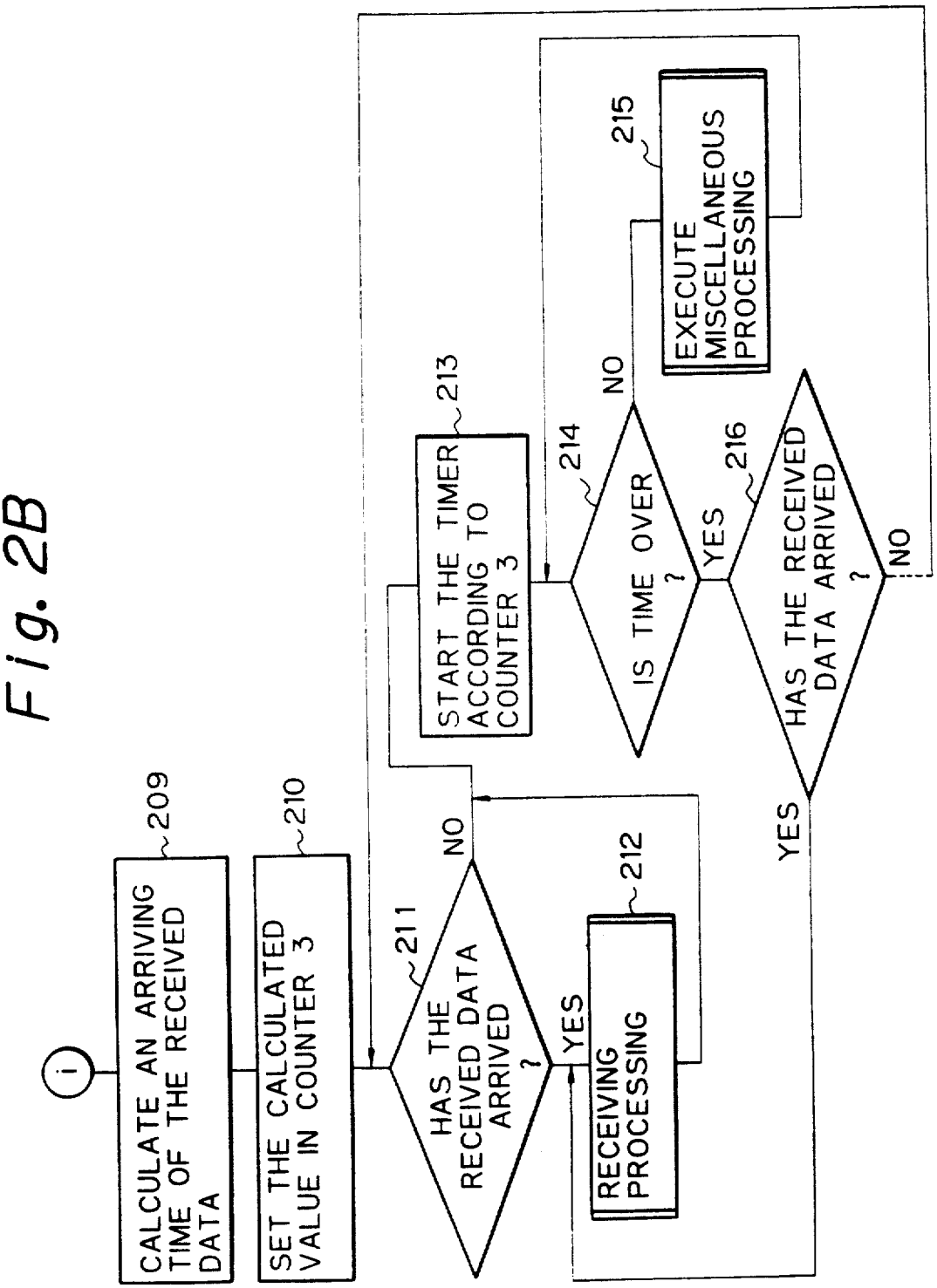

Next, operation of the data sink shown in FIG. 1 will be described, making reference to flowcharts shown in FIGS. 2A, 2B, and 3.

When the power source of the data sink is turned on, the interval timer 2 is initialized and starts timing at an initial timing (interval). At the same time that the interval timer 2 is started, the data receiving circuit 1 initializes (resets) the measured value counter 3 and the received data quantity counter 4 (steps 201 and 202).

The data receiving circuit 1 executes data receiving operations, (such as transferring remaining data to the data processor 6, etc.), until receiving new data from the data transmission unit 5. When the data receiving circuit 1 receives the first data, the received data quantity counter 4 starts counting (steps 203, 204, and 205).

Figure 3:
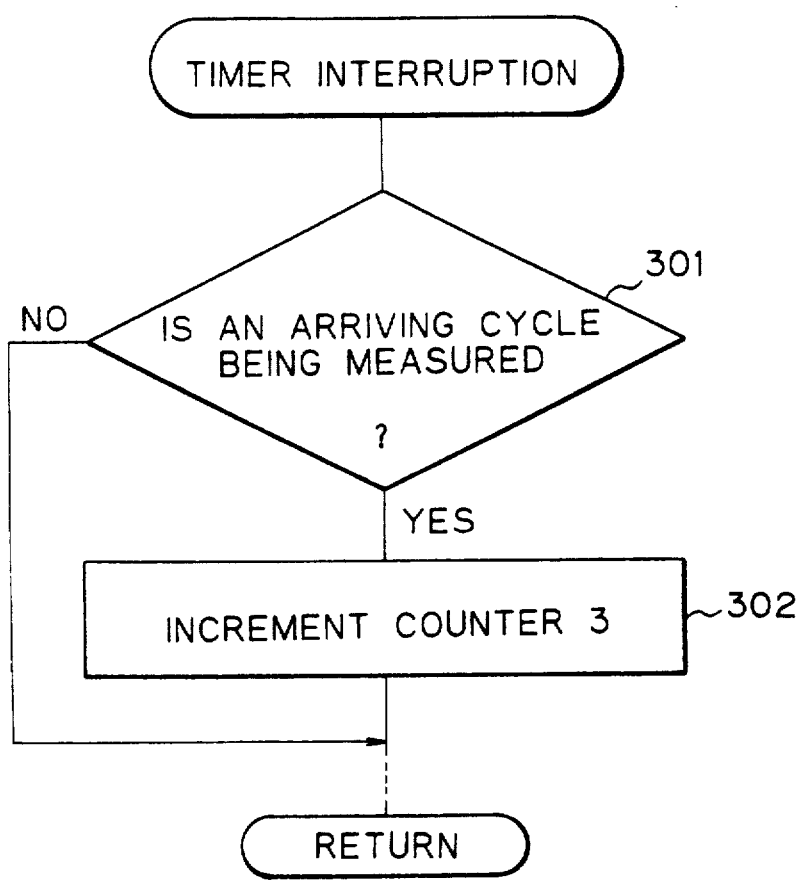
FIG. 3 is an operational flowchart showing the details of timer interruption processing in the data sink shown in FIG. 1.

As shown in FIG. 3, the interval timer 2, a general-purpose timer, is responsive to the elapse of a time interval interrupt to the data receiving circuit 1. While the data receiving circuit 1 is measuring the periods of the received data, the interval timer 2, causes the measured value counter 3 to count up every time an interruption occurs. Since the interruption period or interval caused by the interval timer 2 is already known, the time interval at which the received data arrives at the data receiving circuit 1 can be obtained, from the number of interruptions stored in the measured value counter 3 (steps 301 and 302).

The data receiving circuit 1, subsequent to the step 205, checks the received data quantity counter 4 for the count value to determine whether or not a predetermined number of data (for example, a few pieces of data) necessary for calculating the average period of the received data has been received from the data transmission unit 5. If not received, the data receiving circuit 1 continues the data receiving operation until the number of the received data reaches the predetermined number (steps 206, 207, and 205).

When the number of the received data reaches the predetermined quantity, the data receiving circuit 1 checks the measured value counter 3 for the count value obtained by counting interruptions caused by the interval timer 2. If a predetermined quantity of data are not received within a certain predetermined length of time, specifically, within a period of time which is several times as long as the time interval of the interval timer 2, the measurement for calculating the mean period of the received data is judged inappropriate, and then the data receiving circuit 1 resets the counters 3 and 4 to execute the measurement over again (steps 208 and steps 202-207).

When within a certain predetermined length of time a predetermined quantity of data are received, the data receiving circuit 1 calculates the mean data arrival period T as a predicted value, using the following equation:

$$T = M/N$$

Where M is the count value of the measured value counter 3 and N is the count value of the received data quantity counter 4.

Then, the data receiving circuit 1 sets the calculated result in the measured value counter 3 (steps 209 and 210). Hereupon, the measurement of the received data period by the data receiving circuit 1 terminates.

Next, the data receiving circuit 1 uses the mean data arrival period T calculated as mentioned above to start the data receiving processing per se.

The data receiving circuit 1 first checks for the presence of received data. If data have already arrived, the monitoring of on the basis of the mean data arrival period T is not applicable. Therefore, the data receiving circuit 1 causes the data processor 6 to start a receiving operation and then proceeds to the operational flow that will be described later with respect to data that have not arrived yet (steps 211 and 212).

When data have not arrived yet, the data receiving circuit 1 proceeds with the monitoring of received data in the mean data arrival period T using the value of T stored in the measured value counter 3 as a time interval to cause the interval timer 2 to operate until time is over. While the interval timer 2 is running toward its full count, the data processor 6 may execute miscellaneous processing requiring comparatively short processing time so as to avoid waste of processing time (steps 213, 214, and 215).

When the interval timer 2 reaches a count corresponding to the time-over, the data receiving circuit 1 checks for the arrival of received data. When, contrary to the expectation, data have not arrived yet, the data receiving circuit 1 judges that there will be spare time till the next arrival and then, in the omitted steps indicated with dotted lines in FIG. 2B the data processor 6 executes processing of data already received, such as decoding and other processing requiring comparatively long processing time, and returns to the step 211 (step 216).

When, data have already arrived according to the expectation, the data receiving circuit 1, accomplishes data receiving processing, and then the interval timer 2 to start at the intervals set by the measured value counter 3 to continue processing in a like manner (steps 212-216).

In summary, in accordance with the illustrative embodiment of the present invention, upon receiving a few pieces of data coming from the data transmission unit 5, the number of the received data is stored in the received data quantity counter 4 and the number of interruptions made for measuring the period of the received data is stored in the measured value counter 3. When the stored values are appropriate, the data sink obtains a predicted value for the received data, i.e. the mean data arrival period in the data receiving circuit 1. Then, the data sink causes the interval timer 2 to be set with the mean data arrival period as the time interval, to interrupt the data receiving circuit 1 at every elapse of the time interval. Basically, the data sink employs the received data monitoring method to start the data receiving processing.

Consequently, without using specific hardware, such as an interruption generating circuit, it is possible to simplify the structure as well as reduce the cost of the data sink.

Further, since the monitoring period of the data sink substantially accords with a the period in which data is transmitted from the outside of the data sink, the processing time for starting data receiving processing in the data receiving circuit 1 can be shortened to the extent accomplished by the afore-mentioned interruption method and, though the data sink employs the received data monitoring method, processing efficiency can be remarkably heightened.

In addition, the above-mentioned illustrative embodiment is directed to the case of calculating an arrival period when the power source is turned on. The present invention, however, is not to be confined to this case, and it is also possible to design the data sink to periodically repeat the estimation of the received data period after the power is turned on, for example, to have a more accurate timer interruption interval.

Still further, in the illustrative embodiment of the present invention the expected period of the received data is calculated as a mean value, but the calculation is not limited to obtaining a mean value. It is also possible to use other statistical methods to obtain a value closer to the arriving interval.

Still further, the calculated result is directly used as the interval time for the interval timer 2 in the illustrative embodiment. However, additional processing, such as shortening or lengthening the calculated period of the received data may be used to obtain a time interval which makes the prediction effect more practical.

While the present invention has been described with reference to the particular illustrative embodiment, it is not to be restricted by the embodiment out only by the appended claims. It is to be appreciated that those skilled in the art can change or modify the embodiment without departing from the scope and spirit of the present invention.

What is claimed is:

1. A data sink for receiving data from a data source which repeatedly emits data, comprising:

data processing means for carrying out data processing on data transmitted from the data source;

timing means for generating a timing signal having a timing interval;

data receiving means for receiving data from the data source and for temporarily storing the received data, the data receiving means including monitoring means, responsive to the timing signal, for periodically monitoring to detect the presence of temporarily stored data at times determined by the timing interval of the timing signal and to transfer any temporarily stored data detected at the time of monitoring to the data processing means;

first counting means for counting the number of data received by the data receiving means, as it is being received, to produce a first count representative of the number of received data; and second counting means for measuring a period of time during which the data receiving means receives the data to produce a second count representative of the measured period of time, wherein the data receiving means includes a buffer memory which temporarily stores the received data, and additionally includes arithmetic means for calculating a predicted period for the data received by the data receiving means on the basis of the first and second counts, wherein the timing means uses the predicted period as the timing interval for the timing signal during at least a portion of the time that the data sink receives data from the data source, wherein the monitoring means includes means for checking whether or not data have been temporarily stored in the buffer memory, and means for responding to the timing signal by treating it as an interrupt request, wherein the data receiving means further includes means for controlling the second counting means to count the number of interrupt requests and to store the result as the second count, and wherein the arithmetic means includes means for multiplying the second count by an initial timing interval and dividing the product by the first count to obtain the mean period of time for receiving data from the data source, the mean period being employed as the predicted period.

2. A data sink in accordance with claim 1, wherein the data receiving means further comprises means for resetting the first and second counting means if the data receiving means has not received a predetermined number of data in a predetermined length of time.

3. A data sink in accordance with claim 2, wherein the data receiving means further comprises means for causing the data processing means to execute data processing on the data, if any, that have been transferred from the data receiving means, if the data receiving means has not received data from the data source in a time interval.

4. A data sink in accordance with claim 1, wherein the data receiving means further comprises means for providing a first data receiving operative mode, in which the data receiving means causes the first and second counting means to produce the first and second counts to calculate the predicted value, and a second data receiving operative mode, in which the data receiving means periodically monitors the arrival of the data from the data source in the time interval and, when data have been received, transfers the received data to the data processing means, the first and second data receiving operative modes of the data receiving means being operable one at a time.

5. A data sink in accordance with claim 4, further comprising a power supply, and wherein the data receiving means begins the first data receiving operative mode when the power supply is turned on, and begins the second data receiving operative mode when the predicted period is obtained.

6. A data sink for receiving data from a data source which repeatedly emits data, comprising:

an interval timer;

data receiving means for receiving data from the data source, said data receiving means controlling the receiving of data from the data source and including monitoring means, responsive to a timing signal of said interval timer, for periodically monitoring the arrival of data from the data source at times determined by said interval timer;

data processing means for carrying out data processing on data received from the data source through said data receiving means, said data receiving means transferring data it receives from the data source to said data processing means;

first mounting means for counting the numbers of data received by said data receiving means, as it is being received, to produce a first count representative of the number of received data; and second counting means for measuring a period of time within which said data receiving means receives the data to produce a second count representative of the measured period of time, wherein said data receiving means includes buffer memory means for storing the received data therein, and additionally includes arithmetic means for calculating a predicted period for data receiving by dividing the first count by the second count, wherein said interval timer uses the predicted period as the timing for the timing signal during at least a portion of when the data sink receives data from the data source, wherein said monitoring means includes means for checking whether received data have been stored in said buffer memory means or not, and means for responding to the timing signal by treating it as an interrupt request, wherein said data receiving means further includes means for controlling said second counting means to count the number of interrupt requests caused by said interval timer and to store the result as the second count, and wherein said arithmetic means includes means for multiplying the second count by an initial timing and dividing the product by the first count to obtain the mean period of time for receiving data from the data source, the mean period being employed as the predicted period.

7. A data sink in accordance with claim 6, wherein said data receiving means further comprises means for resetting said first and second counting means if said data receiving means has not received a predetermined number of data in a predetermined period of time.

8. A data sink in accordance with claim 7, wherein said data receiving means further comprises means for causing said data processing means to execute data processing on the data, if any, that have been transferred from said data receiving means, if said data receiving means has not received data from the data source in a time determined by said interval timer.

9. A data sink in accordance with claim 6, wherein said data receiving means further comprises means for providing a first data receiving operative mode, in which said data receiving means causes said first and second counting means to produce the first and second counts to calculate the predicted value, and a second data receiving operative mode, in which said data receiving means periodically monitors the arrival of the data from the data source in the time determined by said interval timer and, when data have been received, transfers the received data to said data processing means, and the first and second data receiving operative modes of said data receiving means become operable one at a time.

10. A data sink in accordance with claim 9, further comprising a power supply, and wherein said data receiving means begins the first data receiving operative mode when the power supply is turned on, and begins the second data receiving operative mode when the predicted period is obtained.

* * * * *